June 6, 1967     D. F. ROXBURGH     3,323,420
AUTOMATIC KEY CUTTING AND VENDING MACHINE
Filed Nov. 24, 1961     8 Sheets-Sheet 1

INVENTOR.
DALE F. ROXBURGH

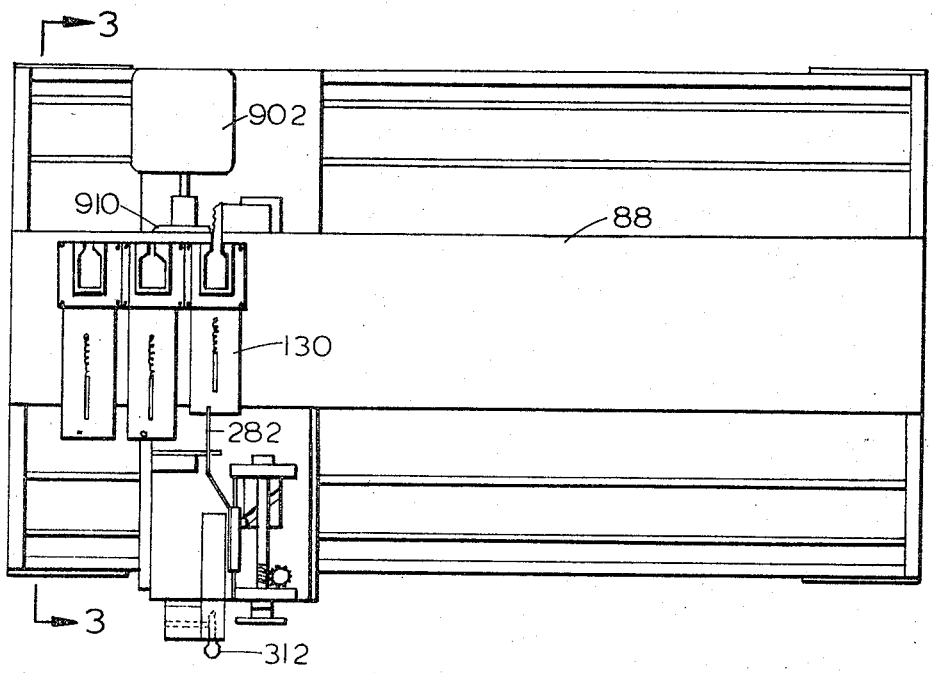
FIG. 2
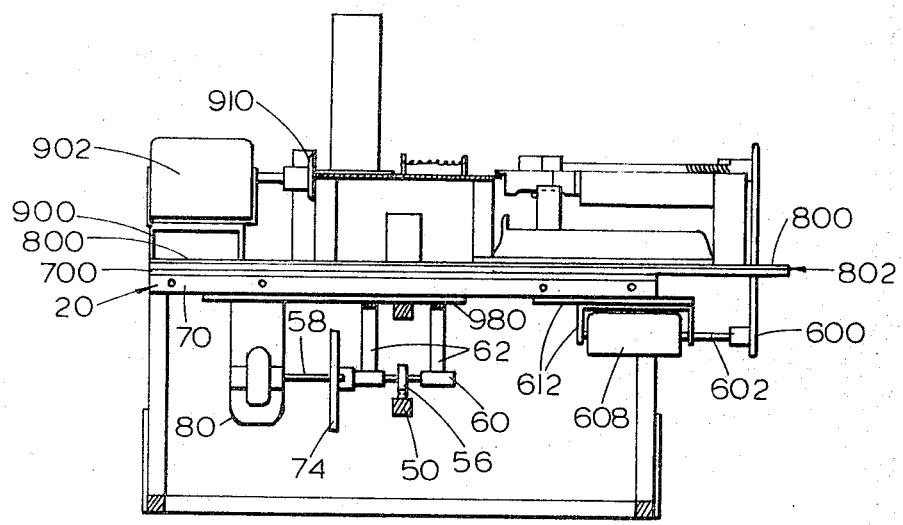
FIG. 3
INVENTOR.
DALE F. ROXBURGH

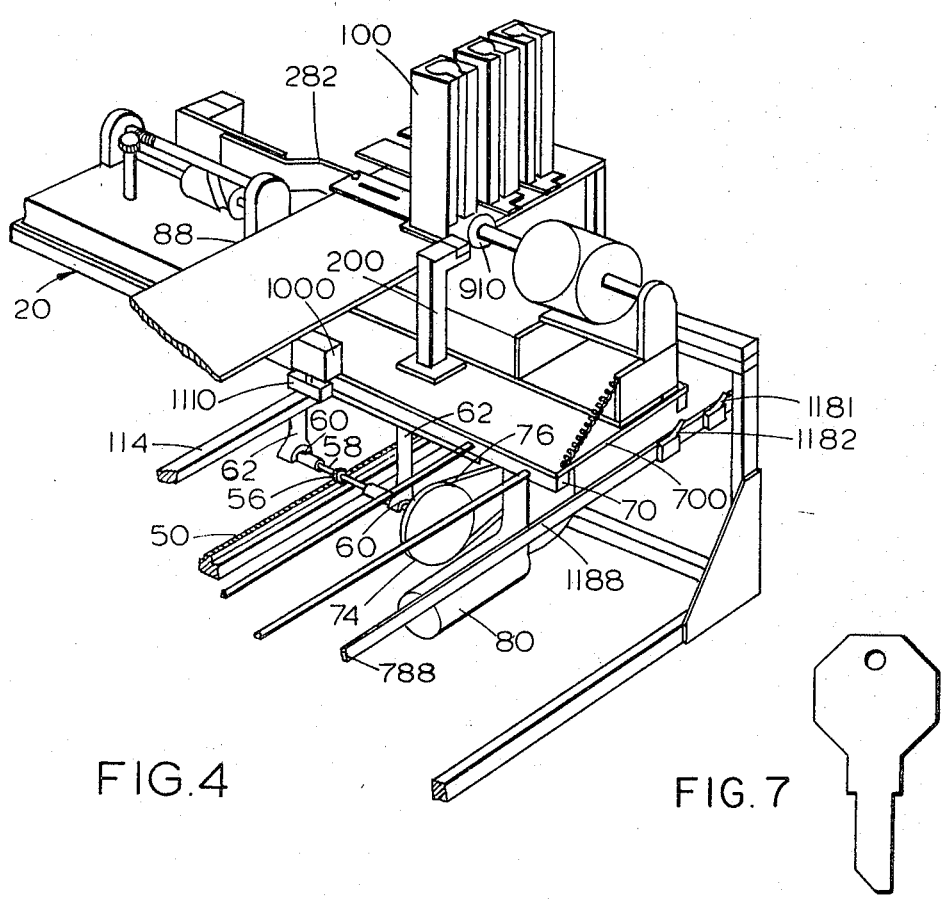
FIG.4
FIG.7
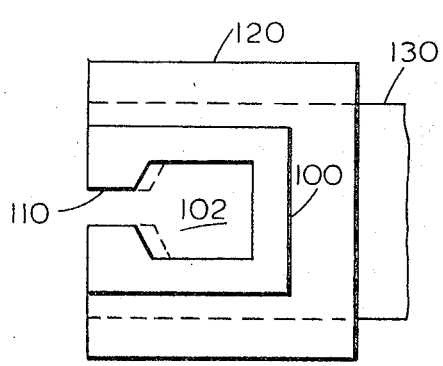
FIG.5
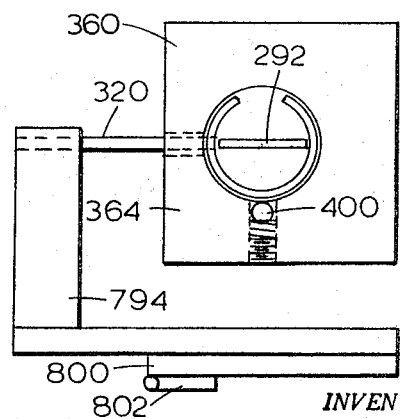
FIG.6
INVENTOR.
DALE F. ROXBURGH
BY June 6, 1967  D. F. ROXBURGH  3,323,420
AUTOMATIC KEY CUTTING AND VENDING MACHINE
Filed Nov. 24, 1961  8 Sheets-Sheet 4
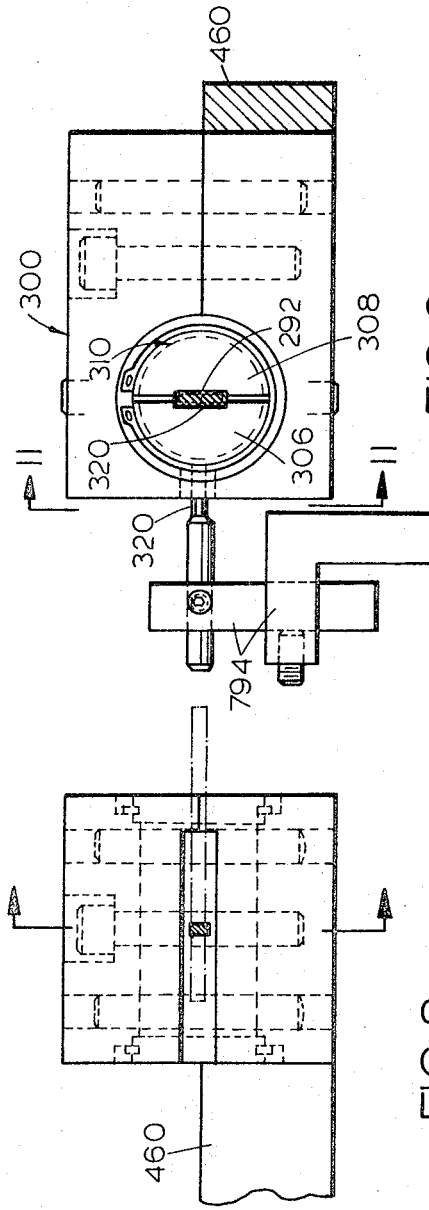
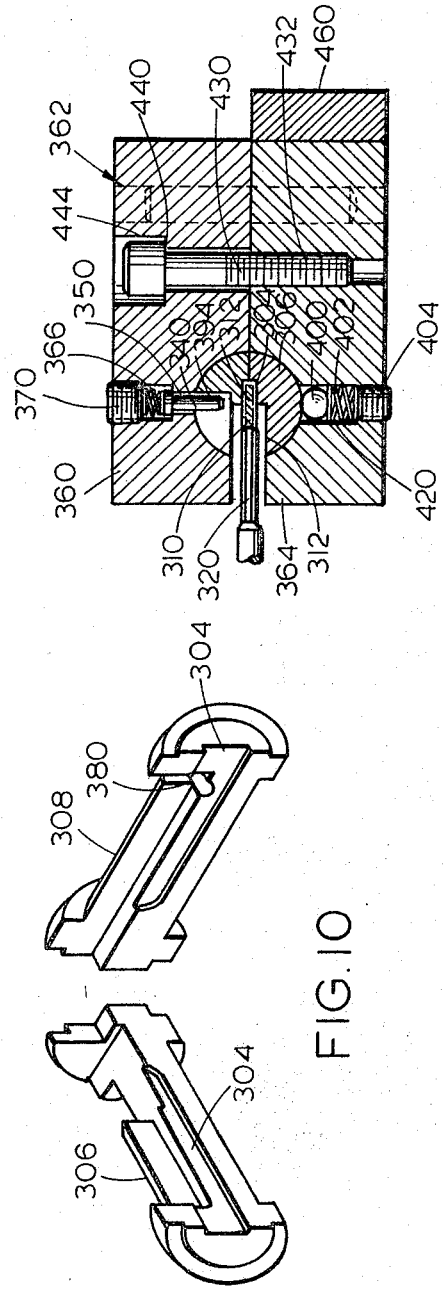
INVENTOR.
DALE F. ROXBURGH June 6, 1967        D. F. ROXBURGH        3,323,420
AUTOMATIC KEY CUTTING AND VENDING MACHINE
Filed Nov. 24, 1961        8 Sheets-Sheet 5
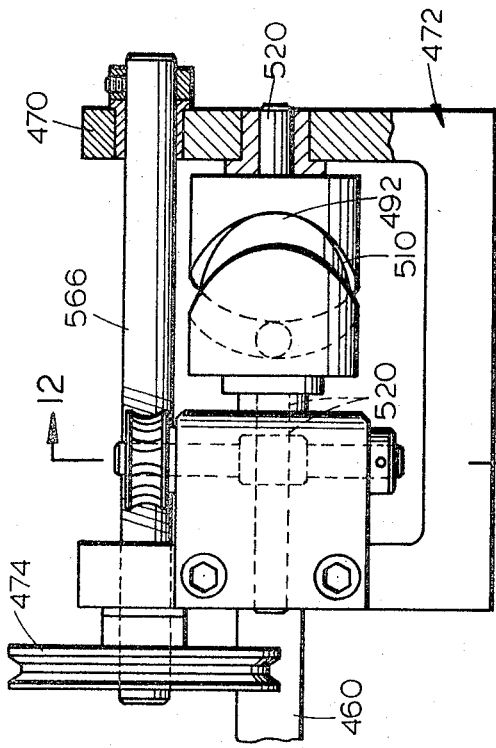
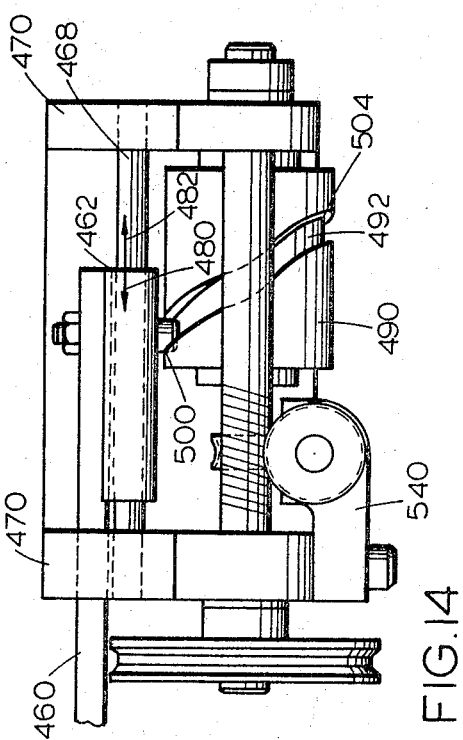
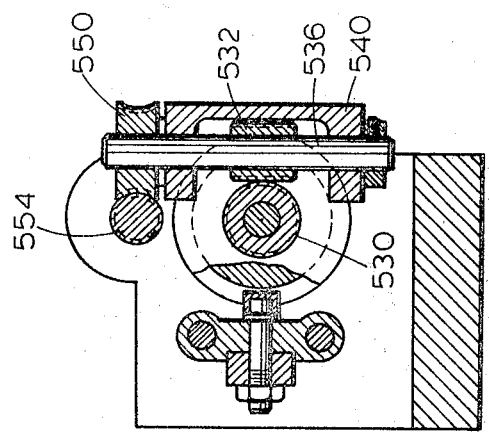
INVENTOR.
DALE F. ROXBURGH

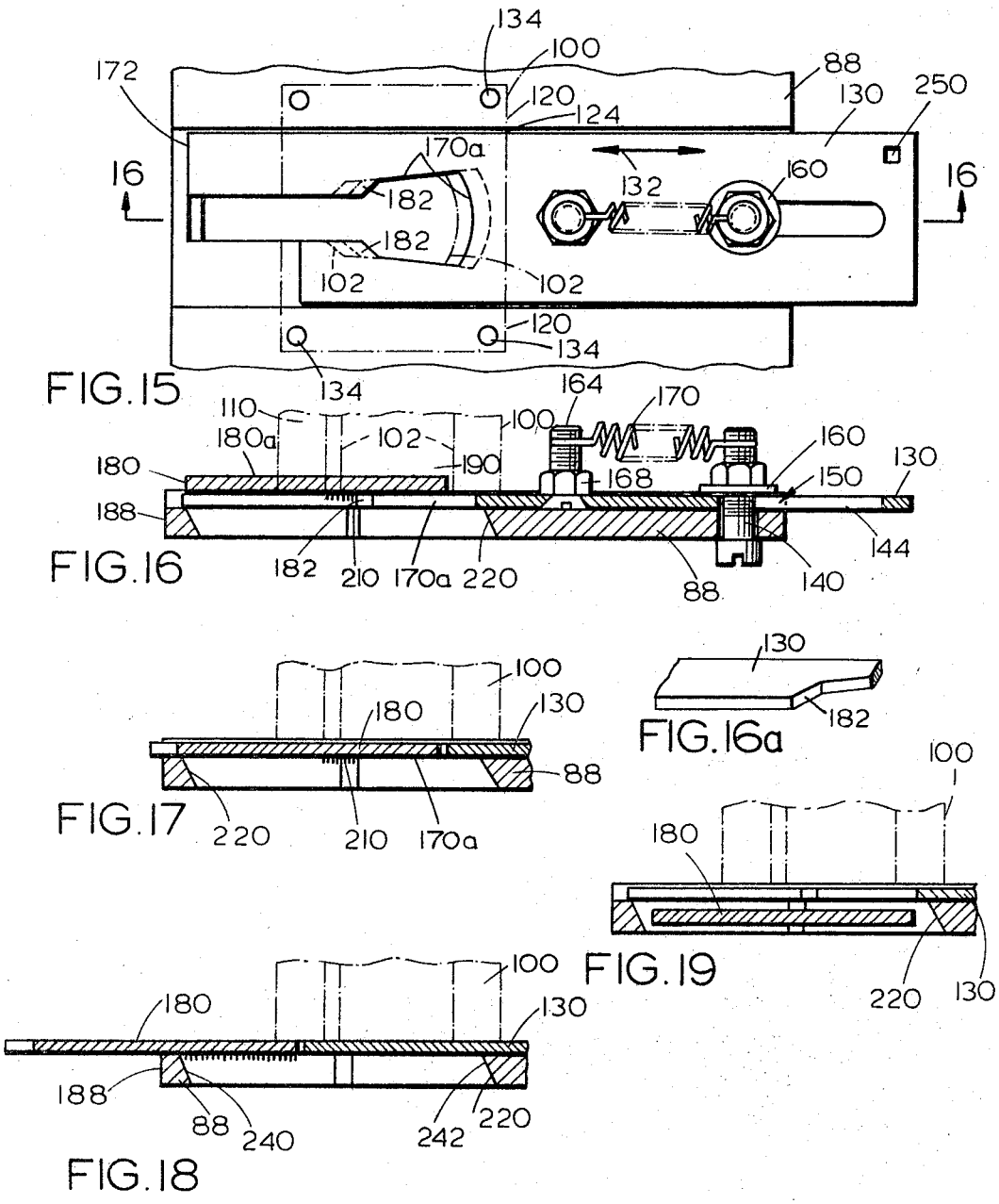

INVENTOR.
DALE F. ROXBURGH

June 6, 1967 D. F. ROXBURGH 3,323,420
AUTOMATIC KEY CUTTING AND VENDING MACHINE
Filed Nov. 24, 1961 8 Sheets-Sheet 8

INVENTOR
DALE F. ROXBURGH

BY

ATTORNEY

# United States Patent Office 3,323,420
Patented June 6, 1967

3,323,420
AUTOMATIC KEY CUTTING AND VENDING MACHINE
Dale F. Roxburgh, Omaha, Nebr., assignor to
Coin-a-Key, Inc., Omaha, Nebr.
Filed Nov. 24, 1961, Ser. No. 155,535
1 Claim. (Cl. 90—13.05)

This invention relates to key making machines and more particularly it is an object of this invention to provide a key cutting and vending machine.

Automobile keys and house keys come in many varieties, usually each having a distinctive shape. It is an object of this invention to provide a machine with many magazines each for holding a stack of key blanks of a certain type, such as for example, the type for a certain make of automobile of a given year number.

It is an object to provide a machine which can be operated simply by the reading of instructions pertaining to each of a series of control buttons, then after inserting a sample key and pressing the proper button, the machine will automatically select a key from the corresponding key magazine, cut it, and eject it for delivery to the user.

A particular object is to provide means for clamping a sample key in a sample key receiving opening whereby it will be firmly held while its notches are traced by a guide to which latter a cutting wheel makes corresponding cutting movements.

A particular object is to provide a machine as described having means for upholding a stack of keys in a key magazine until such time as one is to be selected for cutting, means for selecting just one key from such a stack for cutting, means for supporting the key while being cut, and means for retracting the key and allowing it to be discharged without dislocating the remaining keys in the stack, and means for returning all parts to original positions such that this process can be repeated.

A further object is to provide a mechanism for initiating the selection of the key blank, this mechanism being movable back and forth in the machine, and in further combination with means for stopping the travel of this mechanism at exactly the point at which it is opposite a desired key blank magazine.

Still another object is to provide electrical circuit means for making possible the complete operation of the machine except for the manual positioning of the sample key and the manual pressing of the correct button corresponding to a given key magazine.

A further object is to provide means for automatically causing a reversible motor driving said movable key blank selection initiation mechanism to be automatically reversed for a return trip of the mechanism back from a key magazine and to be set once more in forward drive ready for the next forward trip thereof.

It is an object of this invention to provide an improvement over my own original patent application titled, "Automatic Key Making and Vending Machine," Ser. #89,083, filed Dec. 30, 1960 and now abandoned.

Other and further objects and advantages of the present invention will be apparent from the following detailed description, drawings and claim, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claim.

In the drawings:

FIGURE 2 is a top plan view of the machine.

FIGURE 3 is a sectional view taken along the line 3—3.

FIGURE 4 is a perspective view of a left end portion of the machine as seen in FIGURE 1.

FIGURE 5 is a bottom plan view of the key magazine and a mechanism which slides the key out of the magazine individually.

FIGURE 6 is a frontal elevation of a key clamping device portion of the machine.

FIGURE 7 is representative of the type of key blank cut and delivered by this machine.

FIGURE 8 is a left side elevation of a coin receiving assembly portion of the machine.

FIGURE 9 is a frontal elevation of the key receiving portion of the machine.

FIGURE 10 is a perspective view of separated portions of a key clamping assembly portion of the key-holding mechanism of FIGURE 9.

FIGURE 11 is a view-in-section taken along the line 11—11 of FIGURE 9.

FIGURE 12 is a sectional view taken along the line 12—12 of FIGURE 13.

FIGURE 13 is a left side elevation of the key slide controlling mechanism of the invention.

FIGURE 14 is a top plan view of the key slide controlling mechanism.

FIGURE 15 is a top plan view of the key slide portion of the machine with a key magazine shown in phantom lines and with a base plate opening shown in dotted lines, the slide being in a retracted position.

FIGURE 16 is a sectional view of the parts shown in FIGURE 15 as taken along the line 16—16.

FIGURE 16a is a perspective detail of a portion of FIGURE 16.

FIGURE 17 is a view similar to the left end of FIGURE 16, but with the parts shown in a key slide advancing position.

FIGURE 18 is a view similar to FIGURE 17, but with the parts shown in a position for holding the key in a cutting position.

FIGURE 19 is a view similar to FIGURES 17 and 18, but with the key falling out through the base plate.

Figure 1:
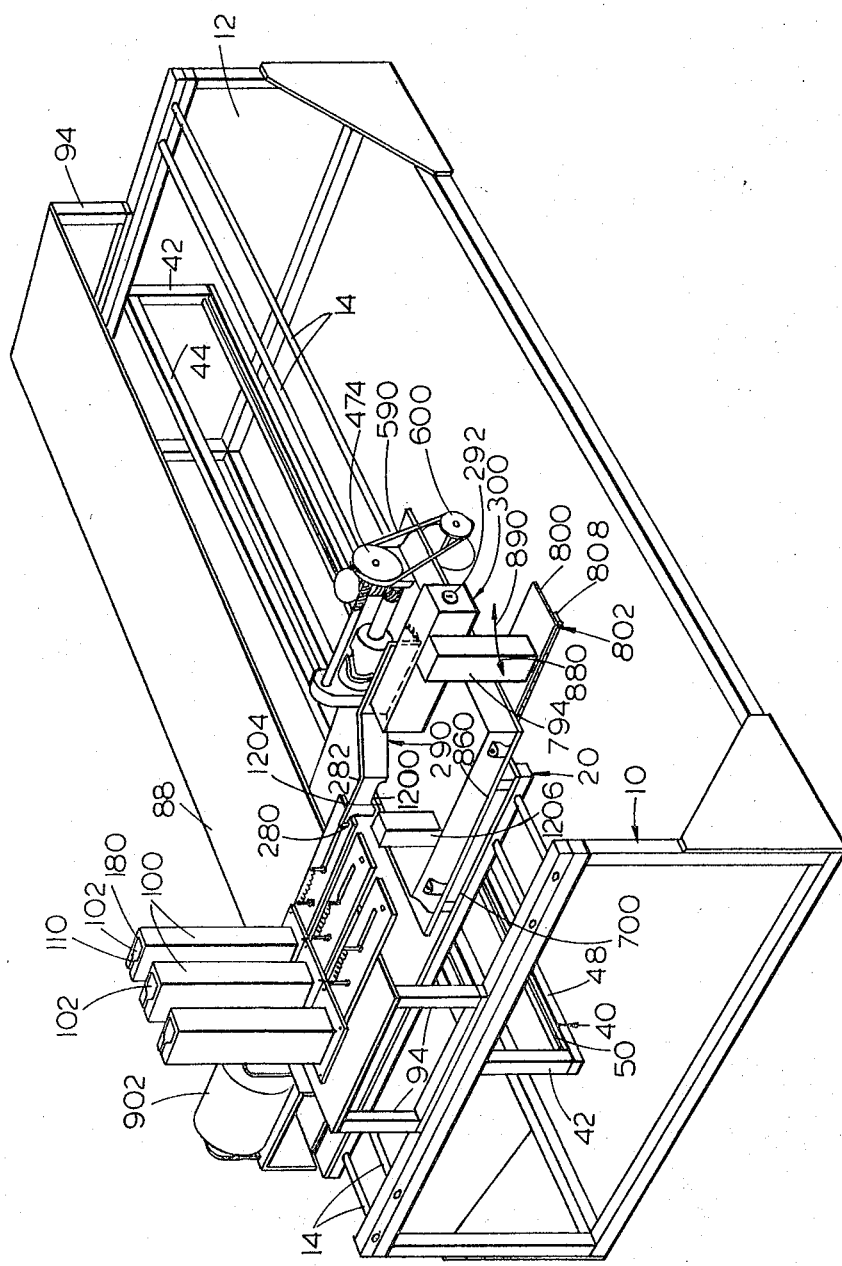
FIGURE 1 is a perspective view of the machine of this invention.

Referring now to FIGURE 1, the key making and vending machine of this invention has a frame generally indicated at 10. Frame 10 has a relatively open center generally indicated at 12 and at an upper side of the open center 12 are a plurality of horizontal shafts 14 fixed to the frame 10. Certain of the shafts 14 are disposed at the front of the machine and others are disposed at the rear of the machine.

A certain mechanism for receiving a sample key and another mechanism for cutting a selected key blank is mounted on a sliding platform generally indicated at 20 which slides back and forth on the shafts 14.

A gear track generally indicated at 40 extends the length of the machine and is disposed horizontally and is spaced below the shafts 14 on suspension members 42 partially supported by a brace 44.

The gear track assembly 40 has a lower frame member 48 which is horizontally disposed and which has a horizontally disposed longated gear track 50 protruding upwardly therefrom and having teeth spaced apart thereon for engagement by a gear 56 on a shaft 58 journaled in bearings 60 on suspension posts 62 which latter extend downwardly from and are anchored to bottom members 70 of a sliding assembly 20 earlier mentioned.

The shaft 53 is power rotated by a pulley 74 driven by a belt 76. The belt 76 is on a pulley which is mounted on a gear head, not shown, of a gear head motor 80 mounted on the movable assembly 20.

The movable assembly 20 can also be called a scanning assembly 20.

Above the frame 10 is a stationary platform 88 spaced above the remainder of the frame on supports 94 in such a manner as to be a substantial distance above the shaft 14. The purpose of the platform 88 is to support key magazines 100 which latter are of any suitable number to receive key blanks of many types, each magazine 100 receiving a certain type of a key blank. The interior of each magazine 100 is hollow as seen at 102, the numeral 102 indicating a recess extending vertically the length of each magazine 100, and the latter are each vertically elongated. Each recess 102 has a portion 110 which opens outwardly therefrom toward the rearward side of each magazine 100 respectively.

Referring to FIGURE 1, it will be seen that the interior of each recess 102 is larger for receiving the larger head of a key blank. It is important that each recess 102 be of a shape complemental to a certain type of a key blank and identical thereto so that only one type of a key blank can be placed in that magazine so as to avoid any disorder in the loading of the machine and whereby the machine operates with efficiency.

It will be seen, however, that when the recess 102 is larger than a key blank not intended to be in it, a key blank which is smaller would fit in and to cope with this, the skill of a person loading the machine with key blanks would be depended on in addition to indication on each of the magazines as to what type of key they are to receive.

Each magazine 100 is vertically elongated in order to receive a substantial supply of key blanks each arranged with other like key blanks in a vertical row one above the other. It will be seen that each magazine 100 is mounted on a platform 88 which may sometimes herein be referred to as the base plate, although the bottom of each magazine 100 is spaced from the base plate 88 by spacing members 120 disposed one on each side of a space 124 disposed therebetween in which a key slide 130 is disposed and the key slide 130 is adapted to slide back and forth in the direction of the arrows 132 or 134 being slidably arranged between the spacing members 120.

The spacing members 120 are secured to the base plate 88 by suitable screws 134 and the magazines 100 are suitably fixed to the spacing members 120.

The key slide 130 is slidably mounted on the base plate 88 and it is adapted for only linear movement because it is guided by the spacing members 120 and by a bolt 140 received in an elongated slot 144 there being one such bolt 140 in slot 144 to each key slide assembly and the numeral 150 will be given to a key slide assembly.

The bolt 140 extends through the base plate 88 and has a washer 160 at its upper end slidably engaging the key slide 130. A bolt 164 disposed forwardly of the bolt 140 is fixed to the slide 130 by a nut 168 and a spring 170 extends between the bolts 140 and 164 and is a tension spring tending to urge the slide 130 rearwardly or in the direction of the arrow 132.

The slide 130 has a key receiving opening 170a extending vertically therethrough and opening upon the forward side 172 of the key slide 130.

Referring to FIGURE 15, it will be seen that the vertically elongated recess 102 in the respective magazine 100 in plan view is of a shape in its main portion 190 which corresponds to that of the larger finger grip end of a key plus a small portion 180a of the shank of the key, a portion of which latter fits into the slot 110 of the recess 102.

When the slide 130 is in a rearward or retracted position as shown in FIGURE 15, keys such as the key 180 in FIGURE 16 are upheld by a shoulder 182 of the slide 130 which latter engages under a side edge of the forward side of the finger grip portion 190 of the key.

The shoulders 182 are two in number, one on each side of the key opening 170 of the key slide, as indicated in FIG. 15.

Referring to FIGURE 15, the shoulder 182 is indicated as being in a sense a sort of a shoulder in the slide 130 on each side of the keyhole 170a area.

Referring to FIGURE 17, as the slide 130 comes forward its key opening 170a becomes in registry with the magazine recess 102 whereby a key 180 drops down into the opening 170a in the slide. At this time, as in FIGURE 17, the key is upheld by a shoulder 210 which latter is actually preferably two shoulders 210 disposed one on each side of the upper surface of the baseplate or platform 88. The shoulders 210 are below the shoulders 182 and are formed on the base plate 88 at the edges of the base plate key drop opening 220 whereby the key is upheld by the shoulders 210 and is prevented from dropping through the baseplate 88 whereby the key is thereby carried forward by the slide 130 into a forward key position shown in FIGURE 18 where it is ready for cutting on that portion of its shank which is protruding outwardly from a forward edge 188 of the base plate or platform 88.

The actual dimensions are difficult to show in the drawing, but it is preferred that the opening 220 for key drop is significantly larger than the opening 170a in the slide 130 so that the motion of the slide does not prevent the key from dropping. This can be further enhanced by causing the walls of the opening 220 to slant forwardly at an upper end and rearwardly at a lower end, these walls being shown at 240 and 242 respectively, although the same must be done for all walls of the opening 220 in order that the slant permits the key to come through easier.

Referring to FIGURE 19, we there see the key 180 falling through the key drop opening 220.

It will be seen that each key slide 130 has an opening 250 therein at the rearward side thereof which is adapted to be engaged by a downwardly extending finger 380 of a push arm 282, of a slide control mechanism generally indicated at 290.

Means is provided for causing the arm 282 to move forwardly and rearwardly and this means is responsive to the placing of a key to be duplicated in a key receiving opening 292 of a key receiving assembly 300 which forms a part of the slide control mechanism 290.

Referring now to FIGURE 9, the key receiving opening 292 will be seen to be disposed between recesses 304 in inner sides of two half portions 306 and 308 of a key clamping cylinder generally indicated at 310.

The key clamping cylinder 310 has its two parts 306 and 308 shown in FIGURE 10 and it will be seen that the recesses 304 are substantially of the shape of the shank portion of a key whereby the finger grip portion of the key cannot be received in the recess 304.

The shank portion extends into the recesses 304 although the notch portion of a key indicated at 310 protrudes outwardly of the recesses 304 and into a large longitudinal kerf which extends from the inner end of the cylinder 310 substantially but not entirely to the outer end thereof.

The kerf 312 is for receiving therein a moving stylus 320 which will be later described and which has as its purpose the sensing of notches in the key 312 that is being duplicated.

It is desired that the key be rotatable from a vertical plane as shown in FIGURE 9 to a horizonal plane as shown in FIGURE 11 and that this rotation be exactly 90 degrees and no more. In order to accomplish this, a detent 340 is disposed slidably in an opening 350 in the upper half of a key clamping cylinder block 300 having an upper half indicated at 362 and which has a lower half 364 engageable therewith.

The opening 350 is larger at an upper end for receiving a spring 366 held in place by a plug 370 whereby the detent 340 is urged downwardly into a detent-receiving recess 380 in the right half of the cylinder 310. The recess 380 has a detent-engaging surface 394 which engages the detent 340 at times when the cylinder has been rotated into the position shown in FIGURE 11.

Means are provided for urging the two clamping cylinder portions 306 and 308 toward each other. Such means can be a ball 400 urged by a spring 402 held by a plug 404, the elements 400 to 404 being received in a recess 420 and in the block portion 36 whereby the ball 400 presses against the cylinder portion 306 urging it upwardly.

Other means are provided for holding the two block portions 360 and 364 in regulatable juxtaposition, such means including a bolt 430 threaded in a recess 432 in the lower block 364 and fitting against a shoulder 440 in the upper block 360, the shoulder 440 being disposed in an opening 444 in the upper block 360.

The lower block 364 is supported on a block-supporting bar 460 to which it is suitably secured.

Referring to FIGURE 13, and FIGURE 14, it will be seen that the bar 460 is fixed to a slide follower 462 mounted on a shaft 468 journaled in the sides 470 of a U-shaped frame 472 whereby the slide follower 462 is adapted to slide forwardly and rearwardly in the direction of arrows 480 or 482 as controlled by a drum 490 which is a generally cylindrical shape but has a circumferential groove 492 which latter has an upper portion which extends at an inclination with respect to the axis rearwardly at a left hand side 500 of the groove and forwardly at a right hand side 504 of the groove, and just the reverse in bottom elevation, although the latter is not shown in the drawing. It will be seen in FIGURE 13, however, that the groove 492 has its bottom portion 510 extending rearwardly from its right hand side to its left hand side when the parts are shown in the position of FIGURE 14.

The drum 490 is on a shaft 520 journaled in the sides 470 and has a gear 530 mounted thereon engaged with the worm 532 which latter is on a vertical shaft 536 journaled in a mounting frame portion 540, the upper end of the shaft 536 having on it a gear 550 driven by a worm 554 which actually is a worm thread on a shaft 566 journaled in the ends 470, and driven by a pulley 474 seen in FIGURES 13 and 14 and as best seen in FIGURE 1, connected by a belt 590 to a pulley 600 which as seen in FIGURE 3 is on a shaft 602 driven by a motor 608.

The motor 608 is attached by brackets 612 to the underside of the member 70 or to a base plate 700 of the movable scanning assembly or sliding scanning mechanism 20.

It will be seen that the frame 472 is also mounted on the scanner plate 700 whereby it moves therewith.

It is now necessary to explain how the cutting mechanism is synchronized with the scanning stylus 320.

Referring to FIGURE 6, it will be seen that the stylus 320 is mounted on a stylus post 794 which extends downwardly to a stylus post and a motor mounting carrying plate 800 which can also be called the swinging plate 800, the latter being mounted upon the upper leaf, FIGURE 6, of a hinge 802 which has a lower hinge leaf 808 fixed to the upper side of a scanner base plate or platform 700 whereby, as best seen in FIGURE 1, the post 794 and its stylus is adapted to swing at their upper ends in an arc indicated by the arrows 880 and 890 about the axis of the hinge 802.

Also mounted on the swinging plate 800 and on the forward side of the machine is a motor mounting 900 for a motor 902 carrying a key cutting wheel 910 extended rearwardly therefrom.

As thus described, as the stylus 320 of FIGURE 9 moves in and out with the notches in the key, being used as a sample, then the motor 902 and its cutting wheel 910 will define exactly the equivalent motion with respect to a key to be cut which is held in the position shown in FIGURE 18 at 180.

Now the mechanism to cause the cutting wheel 910 to be in the right position and to cause the push arm 282 to be opposite the right key slide 130 is to be described. This drive is accomplished by the gear wheel 56 running on the gear track 50, the gear 56 being on a shaft 58 journaled in bearing 60 carried by posts 62 which latter are fixed to the underside of the base plate 700 of the scanner by means of a certain plate 980 best seen in FIGURE 3.

The shaft 58 is driven by a pulley 74 thereon which latter is driven by a belt 76 connected to a pulley not shown which is driven by the motor 80, as seen in FIGURES 3 and 4.

Figure 20:
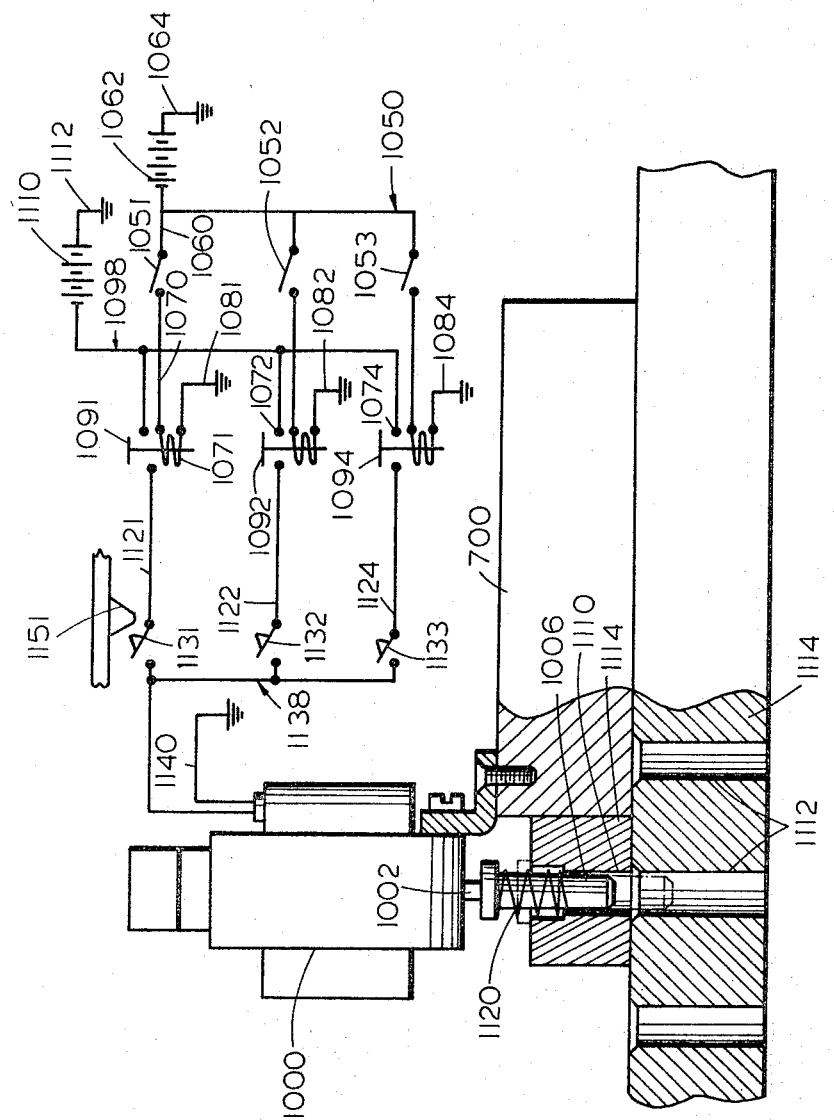
FIGURE 20 is a solenoid stop mechanism portion of the machine and support therefor.

Referring to FIGURE 20 and also to FIGURE 4, it will be seen that a solenoid 1000 is mounted on the base plate 700 and has a core 1002 which is adapted to press a latch pin 1006 downwardly through a stationary block 1110 fixed to the plate 700 or its support 70 whereby the pin 1006 travelling through an opening 1114 in the block 1110 is adapted to register with vertical openings 1112 which are longitudinally spaced apart along a stop bar 1114 which latter is fixed to the frame.

It will be seen that the pin 1006 is normally in an unlatched position, being held upwardly by a spring 1120 where upon operation of the solenoid 1000, it will go down into latching position, at first sliding along the top of a bar 1114 until it can be received in the next opening 1112 for it to pass to.

Referring to FIGURE 20, a control circuit is generally indicated there at 1050.

The control circuit has many switches 1051, 1052, 1053, each of which is related to one of the three illustrated key magazines 100. It will be understood, of course, that there can be any number of switches proportional to any number of key magazines for accommodating any desired number of different types of keys.

If a user, for example, has the key of a certain type and year of car which he wants to duplicate, he would look on a chart, not shown, which would indicate to him which key to push. Assuming that the key 1051 was the key corresponding, then he would push this key which latter closes the circuit between wires 1060 leading to a power source 1062, the other terminal of which is grounded by a wire 1064.

The switch 1051 closes the circuit between the wire 1060 and a wire 1070 leading to a solenoid 1071 which has counterpart solenoids 1072 and 1074. The solenoid 1071 has its other terminal grounded by a wire 1081 and each solenoid has its other terminal grounded by a wire 1082 or 1084 respectively.

The solenoids 1071, 1072, 1074 each operate switch elements 1091, 1092, 1094 which latter are adapted, when the solenoids are actuated, to close circuit between a circuit 1098 leading to power source 1110 which latter is grounded at its other terminal by wire 1112.

Other terminals engaged by the switch elements 1091, 1092, 1094 lead to wires 1121, 1122, and 1124 leading to resilient switch contact members 1131, 1132, 1133 respectively which are adapted to close circuit with a circuit 1138 leading to a terminal of the solenoid 1000. The other terminal of the solenoid 1000 is grounded by a wire 1140.

The resilient elements 1131, 1132 and 1133 are attached to the frame in a manner not shown in the drawing but protrude upwardly into positions adapted to be engaged by dogs 1151, 1152, and 1153 which are fixed suitably to the underside of the scanner base plate 700. The resilient upwardly extending dog-engaging spring portions 1181, 1182 of two of the switches can be seen on a frame member 788 in FIGURE 4, although the wiring thereto is not shown in FIGURE 4 for convenience of illustration.

It will be seen that in operation when a respective switch button is pushed, for example, the button 1051, then the motor 80 will be energized by means not shown whereby the scanner assembly moves to the left, and as it travels the time comes when one of the dogs 1151 will engage one of the switches 1131. If the respective circuit is energized, this will have an effect, if it is not energized, this would not have any effect, as would be the case if the respective solenoid switch 1091, 1092, and 1094 was not closed.

However, assuming that one of the dogs 1151 closes the switch 1131 of an energized circuit, then the flow of electricity will cause the solenoid 1000 to operate, the latch pin 1006 drop, and move along the top of bar 1114 until the next opening 1112 therein is engaged. At that point the scanner assembly will stop in an ideal location opposite exactly the right one of the magazines 100.

Next another circuit not shown stops the motor 80.

Thereafter another circuit not shown starts the motor 608 responsive to the dropping of the pin 1006 or responsive to the operation of solenoid 1000. The starting of the motor 608 drives the drum 490 causing the follower 500, slide 462, and bar 460 to move inwardly in the direction of the arrow 482, moving in with it the push arm 282 which moves forwardly. It will be seen that the underside of the push arm 282 has a concave recess 1200 therein as best seen in FIGURE 1. This recess engages a guide 1204 which is horizontally disposed and extends from a post 1206 mounted by suitable means in a fixed relation to the scanner base plate or stationary plate 700 whereby because of the forward and downward inclination of the forward wall of the recess 1200, the push arm 282 describes a downward motion as it moves forwardly whereby its downwardly protruding finger 280 engages in the finger receiving opening 250 of a respective key slide 130.

Thereupon further forward motion of the push arm 282 as best seen in FIGURE 1, will cause the respective key slide to define all of the earlier described motions, whereupon the key reaches the cutting position of FIGURE 18.

While the push arm 282 is moving forward, a switch, not shown, operates a circuit, not shown, for energizing the cutting wheel motor 902 whereby as the key moves forwardly from the position shown in FIGURE 17 to the position shown in FIGURE 18, the cutting wheel 910 is, during this period, cutting notches in the key directly corresponding to notches in the master or sample key engaged by the stylus or guide 320.

When the slide has reached a forwardmost position, the further rotation of the drum 490 will cause the slide to be retracted because the push arm 282 is retracted. When the push arm 282 and associated parts have substantially reached their rearwardmost point again, a switch, not shown, and mounted partially on the stationary parts generally stationary with the scanner base plate 700, this switch will be operated. This switch is adapted to start the motor 80 again but this time in an opposite direction since the motor 80 is the reversible motor and because the said switch, not shown, will have been caused to reverse because it is that type of switch.

The said switch, not shown, can be called a reversing switch. This reversing switch is set so that when energized, it will cause the motor 80 to start up and operate in a reverse direction and it is set in this position during all the time that the scanner mechanism is travelling to the left.

The said reverse switch is set to reverse the motor 80 as soon as it is operated and is at this setting all during the leftward movement of the scanner as seen in FIGURE 1. This said reversing switch, not shown, is tripped by engagement of a movable part with a movable part on the frame at a time when the return trip of the scanner is in a direction to the right, as seen in FIGURE 1, and has reached substantially a right end of the frame, or in other words, a return to original position of the scanner.

Another switch, not shown, opens a circuit to the motor 80 as the scanner reaches its original position at the right end of the machine, as seen in FIGURE 1, and this circuit opening or stop switch is a position switch having a movable throw mounted on the moving scanner mechanism and engageable by a dog of a suitable sort mounted on the stationary frame.

During the cutting, the key is further supported by a supporting post 2000 for steadying the key, as seen in FIGURE 4.

FIGURE 4 shows a tension spring 700a anchored at one end to the scanner base plate or stationary base plate 700 and anchored at its upper end to means mounting the motor 902, whereby the spring pulls the motor and consequently the cutter 900 always toward the right so that the cutter is always in engagement with the key and the stylus is always in engagement with the sample key whenever these parts are otherwise in positions for this.

Figure 21:
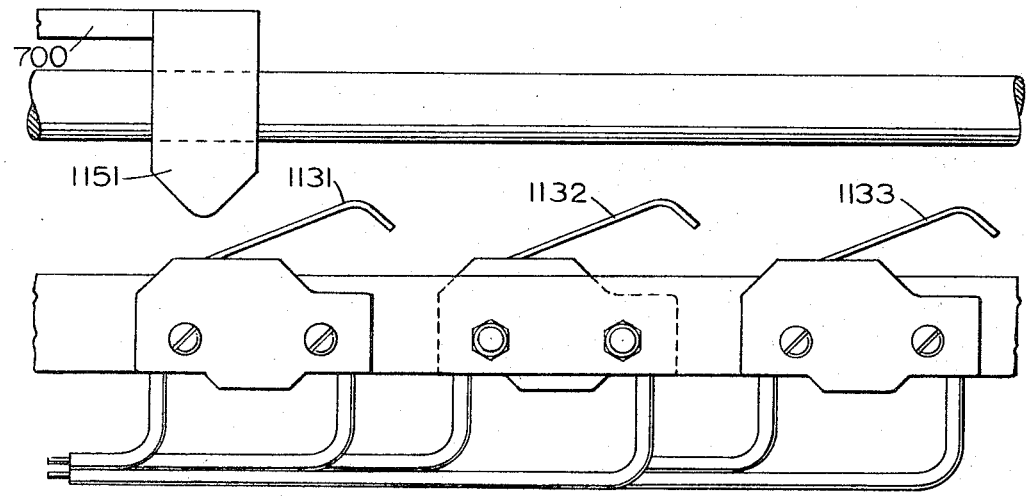
FIGURE 21 is a detail of the back side of the machine adjacent the key magazine end thereof.
Figure 22:
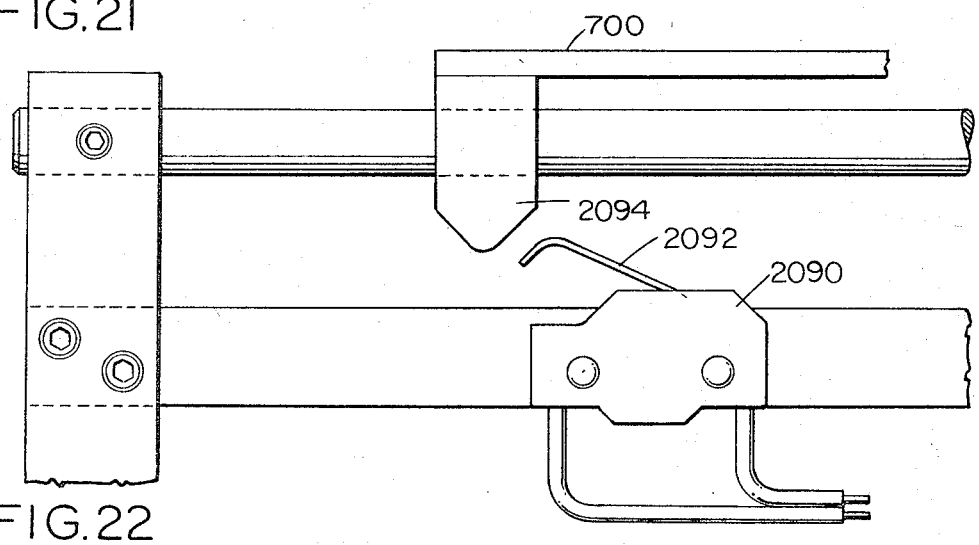
FIGURE 22 is a detail of the back side of the machine at the side opposite to that shown in FIGURE 21.

In FIGURE 21 at 2090 is shown a switch element with throw 2092 which is engageable by a dog 2094 on the underside of the platform 700, the switch 2090 being at the right end of the machine where its engagement by the dog 2094 causes the stopping of the drive motor 80.

Figure 23:
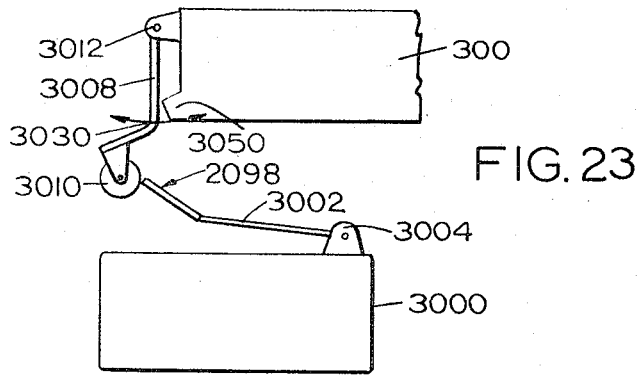
FIGURE 23 is a detail of a motor reversing switch as seen from the right side of the machine.

In FIGURE 23 is a switch generally indicated at 2098 for reversing the motor 80. The switch 2098 has a throw 3002 mounted by resilient means in a mounting 3004 whereby when the throw 3002 is depressed the motor 80 is reversed for causing the scanner to travel to the right.

The member 3004 is mounted on member 3000 fixed suitably to the frame.

A switch control member 3008 is mounted on the member 3000 and has a wheel 3010 on its lower end, the member 3008 being mounted on a pivot at 3002 for swinging in the directions of the double arrow 3030.

When the member 3000 moves inwardly in the direction of arrow 3034, the wheel 3010 passes over the throw 3002 without depressing it since the member 3008 can swing outwardly. However, when the member 3008 moves back in the direction of the arrow 3040, then the member 3008 engages a protrusion 3050 causing the wheel 3010 to depress the throw 3002 causing the motor 80 to be reversed and to start the travel of the scanner mechanism on a return trip to the right, sliding on shafts 14.

From the foregoing description, it is thought to be obvious that an automatic key cutting and vending machine constructed in accordance with my invention is particularly well adapted for use, by reason of the convenience and facility with which it may be assembled and operated, and it will also be obvious that my invention can be changed and modified without departing from the principles and spirit thereof, and for this reason, I do not wish to be understood as limiting myself to the precise arrangement and formation of the several parts herein shown in carrying out my invention in practice, except as claimed.

I claim:

A key blank cutting and vending machine comprising: a frame, a sample key receiving means, means for locking a sample key in said key receiving means to prevent said sample key from being displaced when engaged by a stylus, a movable scanning assembly, means comprising elongated track means on said frame and slidably mounting said scanning assembly on said frame, a plurality of key blank magazines mounted on said frame in longitudinally spaced apart positions thereon, a plurality of key slides slidably mounted for moving keys from under said key magazines forward to cutting position protruding forwardly, a cutting wheel, means drivably mounting said cutting wheel in the position for cutting keys disposed in forward positions, a stylus adapted to follow the grooves in a sample key, means synchronizing movements of said stylus and movements of said cutting wheel, a slide engaging member, means mounting said slide engaging member movably on said scanning assembly for movemets of said slide engaging member forwardly and rearwardly normally to said elongated track means, controllable means for causing said slide engaging member to move forwardly and outwardly normally to said track means, means for causing said slide engaging member to define a movement in a vertical plane at its forward end for engaging a slide simultaneously with inward movement of said slide, return means for causing a slide which has reached a limit of forward movement after a cutting period to move rearward, said return means comprising a hook on said slide engaging member and means on said slides engageable by said hook to cause said hook to pull said lines outwardly when said slide engaging member moves outwardly, said scanning assembly having said cutting wheel and said stylus mounted thereon for travel longitudinally of said machine therewith, yet movable with respect to said scanning assembly for defining movements for key scanning and key cutting, means for initiating movement of said scanning assembly from an original position longitudinally of said frame to a position for placing said cutting wheel at a key-cutting position opposite a desired key blank magazine selected by operation of a manual switch, said manual switch being one of a plurality of manual switches each corresponding to a key blank magazine, means responsive to operation of one said manual switches for causing a solenoid to be operated to drop a detent pin into a locking position with a detent receiving bar fixed to said frame for causing the stopping of said scanning mechanism in the desired position for cutting, said solenoid being normally in a position for retracting said detent pin, means for causing said scanning mechanism to define a return movement toward original position responsive to the reaching of a retracted or rearward position by a respective key slide, comprising a switch adapted to cause the reversing of a drive motor driving said scanning assembly, and a switch adapted to open the circuit to the motor driving said scanning assembly and mounted on said frame and adapted to be engaged by means on said scanning assembly at times when said scanning assembly has reached a original position after a return trip, means for urging a cutting wheel and a stylus into key blank and sample key engaging positions respectively during cutting, whereby a machine is thus described which except for the insertion and rotation of the sample key and the pressing of a manual button corresponding to a desired key blank type, will operate automatically.

References Cited

UNITED STATES PATENTS

| | | | |
|---|---|---|---|
| 2,148,667 | 2/1939 | Yoskowitz et al. | 221—122 |
| 2,148,668 | 2/1939 | Yoskowitz et al. | 90—13.05 |
| 2,965,928 | 12/1960 | Vdolek | 198—24 |

WILLIAM W. DYER, Jr., *Primary Examiner.*

LEON PEAR, *Examiner.*

G. A. DOST, *Assistant Examiner.*